(12) United States Patent
Deitz et al.

(10) Patent No.: US 7,069,580 B1
(45) Date of Patent: Jun. 27, 2006

(54) FUNCTION-BASED PROCESS CONTROL VERIFICATION AND SECURITY IN A PROCESS CONTROL SYSTEM

(75) Inventors: David L. Deitz, Austin, TX (US); William G. Irwin, Austin, TX (US); Godfrey R. Sherriff, Austin, TX (US); Diego M. Benavides, Austin, TX (US); Nathan W. Pettus, Georgetown, TX (US); James H. Moore, Jr., Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 889 days.

(21) Appl. No.: 09/594,678

(22) Filed: Jun. 16, 2000

(51) Int. Cl.
*H04L 9/32* (2006.01)
*H04L 9/00* (2006.01)

(52) U.S. Cl. .............................. 726/2; 726/27; 713/168; 713/182; 713/183

(58) Field of Classification Search ........ 713/200–202, 713/182, 183, 168; 726/2, 27
See application file for complete search history.

(56) References Cited

U.S. PATENT DOCUMENTS 5,552,776 A *  9/1996  Wade et al. ................ 340/5.74
5,751,950 A     5/1998  Crisan .................... 395/188.01
5,774,661 A *  6/1998  Chatterjee et al. .......... 709/203
6,088,451 A *  7/2000  He et al. ..................... 713/201
6,205,480 B1 * 3/2001  Broadhurst et al. ......... 709/225
6,427,209 B1 * 7/2002  Brezak et al. .............. 713/201
6,487,665 B1 * 11/2002 Andrews et al. ............ 713/201

FOREIGN PATENT DOCUMENTS

EP        589 330 A1     3/1994
EP        0586330 A1     4/1994
GB        2 212 627 A    7/1989
WO        WO 90/16126    12/1990

OTHER PUBLICATIONS

Search Report under Section 17(5) issued by the United Kingdom Patent Office on Mar. 1, 2002.
Examination Report under Section 18(3) issued in GB 0114780.0 application by the United Kingdom Patent Office on Nov. 12, 2003.

* cited by examiner

*Primary Examiner*—Matthew Smithers
*Assistant Examiner*—Courtney D. Fields
(74) *Attorney, Agent, or Firm*—Marshall, Gerstein & Borun LLP

(57) ABSTRACT

A process control system capable of executing a function after initiation thereof by a user includes a computer having a memory and a processing unit. A security module stored in the memory of the computer and adapted to be executed on the processing unit of the computer analyzes security information to determine whether the function should be executed. The security information is collected contemporaneously with the initiation of the function and in association therewith.

29 Claims, 11 Drawing Sheets

| | |
|---|---|
| Acknowledge | |
| Batch ID | TEST_BATCH_1 |
| Recipe | EXT_ENAMEL_BC\UP_CHRG_BLND_CNTN |
| Process Cell | BLENDING |
| Unit | BLEND_600 |
| Phase | CS_MANUAL_ADD |
| Parameter | Enter the amount of color stabilizer (CS) to be |

100

Confirmer
| | |
|---|---|
| User Name | DEITZ |
| Password | **** |

| Acknowledge | Cancel | Help |

FIG. 13

| | |
|---|---|
| Acknowledge | |
| Batch ID | TEST_BATCH_1 |
| Recipe | EXT_ENAMEL_BC\UP_CHRG_BLND_CNTN |
| Process Cell | BLENDING |
| Unit | BLEND_600 |
| Phase | CS_MANUAL_ADD |
| Parameter | Materials DB indicates CS past expiration. Co |

YES ▼

Confirmer
| | |
|---|---|
| User Name | DEITZ |
| Password | **** |

Verifier
| | |
|---|---|
| User Name | Administrator |
| Password | **** |

[ Acknowledge ]  [ Cancel ]  [ Help ]

*FIG. 14*

FUNCTION-BASED PROCESS CONTROL VERIFICATION AND SECURITY IN A PROCESS CONTROL SYSTEM

FIELD OF THE INVENTION

The present invention relates generally to process control systems and, more particularly, to a system that provides verification and security functionality therefor.

DESCRIPTION OF THE RELATED ART

Distributed process control systems, like those used in chemical, pharmaceutical or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), are located within the process environment and perform process functions such as opening or closing valves, measuring process parameters, etc. Smart field devices, such as the field devices conforming to the well-known Fieldbus protocol may also perform control calculations, alarming functions, and other control functions typically implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as Fieldbus field devices. The control modules in the controller send the control signals over the communication lines to the field devices to thereby control the operation of the process.

Information from the field devices and the controller is usually made available over a data highway to one or more other hardware devices, such as operator workstations, application servers, personal computers, data historians, report generators, centralized databases, etc. typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, simulating the operation of the process for the purpose of training personnel or testing the process control software, keeping and updating a configuration database, etc.

For example, the DeltaV™ control system, sold by Fisher-Rosemount Systems, Inc., includes multiple applications stored within and executed by different devices located at diverse places within a process. A configuration application, which resides in one or more operator workstations, or an application server therefor, enables users to initiate the execution of several functions, such as creating or changing process control modules, and downloading these process control modules via a data highway to a dedicated distributed controller. The configuration application may also allow a designer to create or change user interfaces which are used by a viewing application to display data to a user and to enable a user to change settings, such as set points, within the process control routine. A dedicated controller and, in some cases, field devices, store and execute a controller application that runs the control modules assigned and downloaded thereto to implement actual process control. Viewing applications, which may be executed on one or more operator workstations, receive data from the controller application via the data highway and display this data to process control system designers, operators, or users using the user interfaces, which may provide any of a number of different views, such as an operator's view, an engineer's view, a technician's view, etc.

Generally speaking, each of the aforementioned applications may constitute software resident on a node of a process control network. The process control network has often been geographically or otherwise distributed, but nevertheless a "closed" network for security and other reasons. The network may be closed in the sense that, for example, the network does not provide for remote access by other computers or hardware not constituting a node of the network. As a result, the applications and/or data available to nodes of the process control network have thus not been typically made available to such remote hardware.

Prior to making such applications and/or data available to a node of the process control network, a user manager application has required a user to log into the network through a security user interface. After a successful "login" process that often includes the entry of user identification and password information, the user may then be allowed to perform any actions that are permitted based on the privileges associated with the user. Prior networked systems have relied upon the login process provided by the network operating system (e.g., Microsoft Windows NT®) to establish user information. In such instances, the process control system may further include a security application, such as with the DeltaV™ control system, that interfaces with the network operating system to determine the set of permitted actions for a particular user.

In the above-described DeltaV™ control system, the user manager application utilizes a lock and key approach that defines security privileges based on the current user logged into the process control network node. Functions or actions that may be available to a user or operator are assigned to a particular lock for which users may be given a key. If the user currently logged into the workstation or other network node has the appropriate key for the requested function, then execution of the function is initiated when requested via the process control application; otherwise, the user is denied the ability to initiate the execution of the function.

Regardless of the manner in which the user is identified, the aforementioned approach to process control security becomes problematic in the event that the user steps away from the workstation, computer or other node. The process control system may be vulnerable to unauthorized control and/or operation unless care is taken to physically secure the node in a locked control room into which only certain users have access. However, the ability to limit physical access to workstations and other nodes of the process control system is becoming increasingly difficult as the process control networks increase in size, complexity, geographic distribution, etc. Furthermore, restricting access to certain types of workstations may be impracticable or impossible, particularly if the process control system is an "open" network, in the sense that, for example, functionality associated with the process control system is distributed to computers, workstations and other hardware devices not having a secure connection to the process control network.

SUMMARY OF THE INVENTION

The present invention is directed to providing security and verification functionality within a process control system. The security and verification functionality may be applied to devices operating either within or external to a process control network of the process control system. In either case, the functionality is preferably applied on an action-by-action, or function-by-function basis to process control applications executed in connection with the process control system.

In accordance with one aspect of the present invention, a process control system capable of executing a function after initiation thereof includes a computer having a memory and a processing unit. A security module stored in the memory of the computer and adapted to be executed on the processing unit of the computer analyzes security information collected contemporaneously with the initiation of the function and in association therewith to determine whether the function should be executed.

In a preferred embodiment, the process control system includes a network and the function is initiated via a device external to the network. The device may include a client that generates a user interface to collect the security information. The client then preferably passes the security information in encrypted form to the security module.

The process control system also preferably includes a process control application stored in the memory of the computer and adapted to be executed on the processing unit of the computer. The process control application generates a security configuration interface for establishing a security parameter for the function executed by the process control system. The security parameter may include data representative of a lock associated with the function executed by the process control system. Alternatively, the security parameter includes data representative of whether execution of the function requires the security information to include a user identification and a password, or data representative of whether execution of the function requires the security information to include verification information.

In another embodiment, the process control system includes a network and the computer resides at a node of the network. The process control system also preferably includes a process control application stored in the memory of the computer and adapted to be executed on the processing unit of the computer. The process control application may generate a user interface to collect the security information from the user.

In accordance with another aspect of the present invention, a method is useful for securing a process control system capable of execution of a function after initiation thereof. The method includes the steps of storing in a memory of the process control system a security parameter associated with the function, collecting security information contemporaneously with the initiation of the function and in association therewith, and determining whether to execute the function based on the collected security information and the stored security parameter.

In accordance with yet another aspect of the present invention, a method includes the steps of establishing a communication link between a process control system and a device external thereto to provide for remote initiation of execution of a function, generating a user interface via the communication link for collection of security information, and determining whether the remote initiation of the execution of the function is authorized based on the collected security information. The user interface generating step preferably includes the step of collecting the security information contemporaneously with the remote initiation of the execution of the function.

In accordance with still another aspect of the present invention, a software system for a process control system capable of execution of a function includes a computer-readable medium and first and second routines, each of which is stored on the computer-readable medium. The first routine collects security information contemporaneously with the initiation of the function and in association therewith, while the second routine determines whether the execution of the function is authorized in accordance with the collected security information.

BRIEF DESCRIPTION OF THE DRAWINGS

FIG. 13 is a fifth exemplary user interface dialog requesting security information contemporaneously with performing a first acknowledgment action in connection with the execution of an application by one or more of the hardware devices of the process control system of FIG. 1; and FIG. 14 is a fifth exemplary user interface dialog requesting security information contemporaneously with performing a second acknowledgment action in connection with the execution of an application by one or more of the hardware devices of the process control system of FIG. 1.

DESCRIPTION OF THE PREFERRED EMBODIMENTS

A process control system as described hereinbelow includes verification and security functionality that does not merely rely upon a network login process to authenticate a user attempting to initiate execution of a process control action or function. The verification and security functionality, which may be implemented in software, provides for the secure execution of such actions or functions, even when initiated by a user from a device external to the network of the process control system. In accordance with one aspect of the present invention, the initiation of the execution of a function may be authorized via a contemporaneous collection and analysis of security information such that the security and verification functionality is provided on an action-by-action basis. Thus, for certain requested actions or functions, a confirmation is made that the user making the request has appropriate security clearance to do so. Moreover, for certain actions or functions of a particularly sensitive nature (e.g., for safety, environmental, or financial concerns), a verification that the action or function should occur may also be performed through the collection and analysis of further security information from another authority, such as a supervisor.

Figure 1:
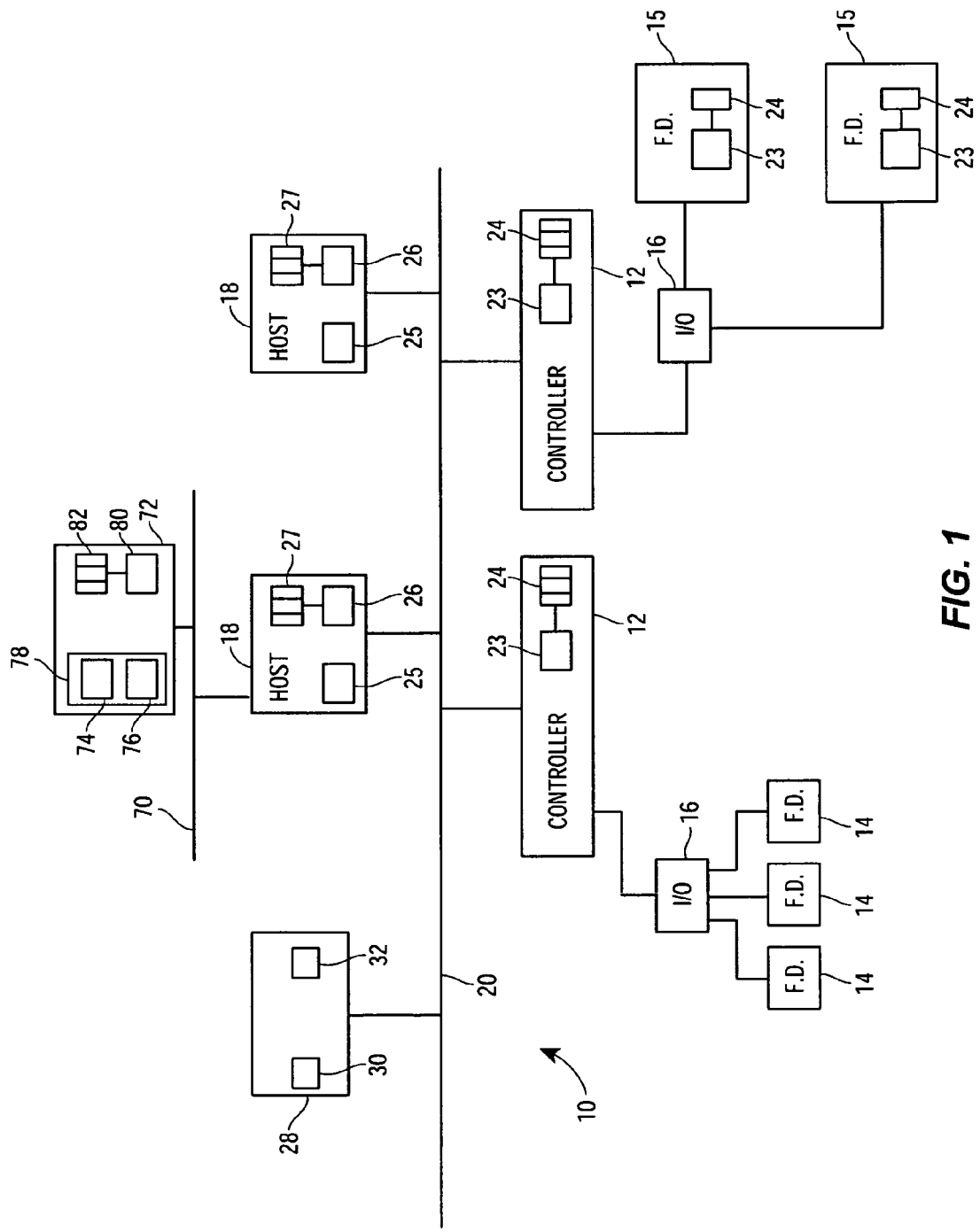
FIG. 1 is a block diagram of a process control system having a network of hardware devices directly connected to a data highway and further having a connection to an external device for remote access to the network.

Referring now to FIG. 1, a process control system 10 includes one or more dedicated process controllers 12 each connected to one or more field devices 14 and 15 via input/output (I/O) modules 16 which may be, for example, Fieldbus interfaces. The controllers 12 are also coupled to one or more host or operator workstations 18 via a data highway 20, which may be, for example, an Ethernet link. Generally speaking, the data highway 20 establishes a process control network having a set of nodes, which will be referred to hereinafter as "network nodes."

While the controllers 12, I/O modules 16 and field devices 14 and 15 are located down within and distributed throughout the harsh plant environment, the operator workstations 18 are usually located in control rooms or other less harsh environments accessible to controller personnel. Each of the controllers 12, which may be by way of example, the DeltaV controller sold by Fisher-Rosemount Systems, Inc., stores and executes a controller application 23 that implements a control strategy using a number of different, independently executed, control modules 24.

In the system illustrated in FIG. 1, the field devices 15 connected to one of the controllers 12 are smart field devices, such as Fieldbus field devices, which include a processor and a memory. These devices store and execute the controller application 23 as well as modules 24, or sub-parts, such as function blocks, of one or more of the modules 24. The modules or parts of modules within the field devices 15 may be executed in conjunction with the execution of the modules within the controller 12 to implement process control as is known.

The host workstation 18 stores and executes a configuration application 25 that is used, in part, to create or change the process control modules 24 and to initiate the downloading of these control modules via the data highway 20 to one of the controllers 12 and/or to field devices such as one of the field devices 15. The host workstation 18 may also store and execute a viewing application 26 that receives data from the controller 12 via the data highway 20 and that displays this information via a display mechanism using predefined user interfaces 27 or views, typically created using the configuration application 25. In some cases, the viewing application 26 receives inputs, such as set point changes, from the user and provides these inputs to the controller application 23 within one or more of the controllers 12.

A configuration management server 28 is connected to the data highway 20 and executes a configuration database application 30 that stores the current configuration of the process control system 10 and data associated therewith in a configuration database 32. The current configuration of the process control system 10 may be modified by the configuration application(s) 25 executed by one or more of the host workstations 18. In order to maintain consistency across the network, the current configuration of the process control system 10 may be downloaded periodically from the configuration database 32 to each of the workstations 18 and other network nodes of the process control system 10.

Figure 2:
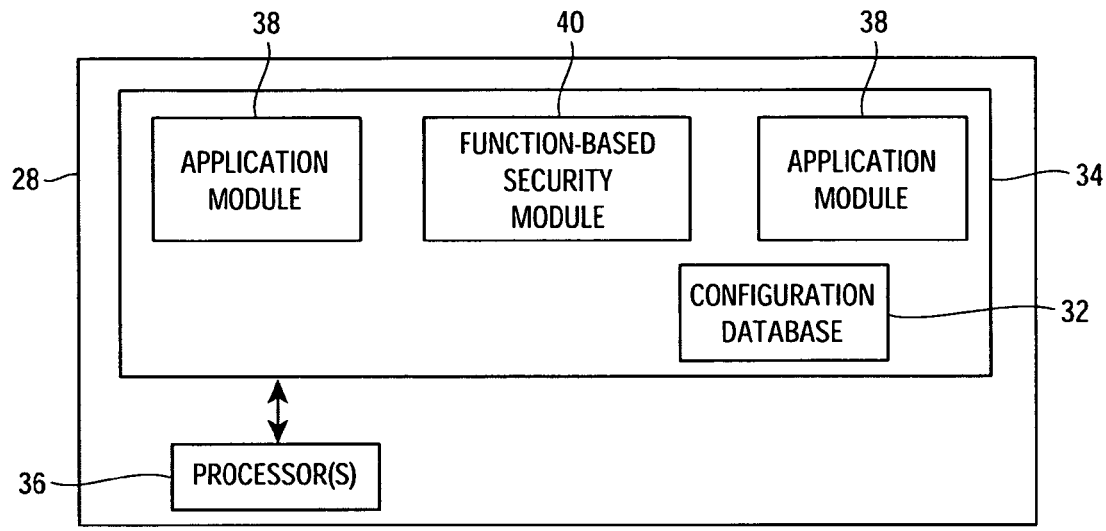
FIG. 2 is a block diagram of an configuration management server of the process control system of FIG. 1 in accordance with one embodiment of the present invention.

FIG. 2 shows the configuration management server 28 in greater detail. The configuration database 32 is stored in a memory 34 together with software modules to be executed by one or more processors 36. The software modules include one or more application modules 38, which may correspond with a configuration application (as described hereinabove), a user manager application (as described hereinabove), or any other application utilized by the process control system 10. When the application modules 38 are executed by the processor 36, and a request for a particular process control function or action has been made, a security module 40 stored in the memory 34 may also be executed by the processor 36 as necessary to provide verification and security functionality in accordance with the present invention.

The configuration management server 28 may provide the functionality of the application modules 38 and security module 40 to any one of a number of network nodes of the process control system 10 via the data highway 20 (FIG. 1). For example, a client module may be established in one of the host workstations 18 that relies upon the configuration application and/or the configuration database 32 to perform configuration management functions for the process control system 10. Alternatively, an application module may be stored and processed locally by the host workstation 18 or other network node. In such a case, execution of functions provided by a configuration or other application may still rely upon the configuration management server 28 for modification of the configuration database 32, which may therefore act as a centralized repository for all configuration information for the process control system 10. Lastly, the configuration management server 28 is not limited to such server responsibilities, and may therefore be utilized by a system operator or other user to execute the same applications found on one or more of the host workstations 18.

Figure 3:
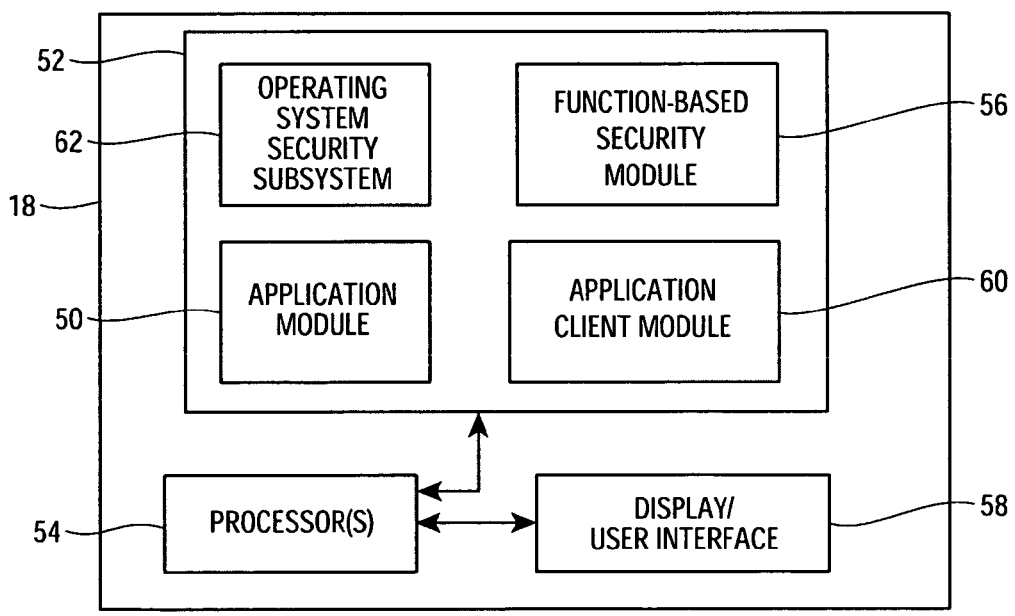
FIG. 3 is a block diagram of a host workstation of the process control system of FIG. 1 in accordance with another embodiment of the present invention.

One of the host workstations 18 is shown in greater detail in FIG. 3. The configuration application 25 (FIG. 1) or any other process control application may be stored as a software application module 50 in a memory 52 for processing by one or more processors 54. In accordance with one aspect of the present invention, a security module 56 is also stored in the memory 52 and adapted to be executed by the processor 54 in association with the execution of process control functions by the application module 50. The configuration application 25 and any other application stored as one of the application modules 50, when executed by the processor 54, provide one or more user interfaces via a display 58. For example, the application module 50 may generate an operator interface, such as the batch operator interface available as part of the DeltaV™ system. The DeltaV™ batch operator interface generally provides a user, operator, etc. with a user interface to control the execution of batch processes and, more particularly, with the capability to initiate the execution of process control functions associated with one or more batch processes. Examples of process control functions within the batch control process include creating a batch, aborting a batch, holding a batch, and acknowledging an alert message regarding a batch. The security module 56 may be executed in connection with the initiation of such functions in order to provide additional security and verification functionality, as will be described in greater detail hereinbelow.

The workstation 18 may have one or more application client modules 60 also stored in the memory 52 and executed by the processor 54. Each such client module 60 corresponds with an application made available via the server 28 (or other networked device) and the data highway 20. The client module 60 generates a user interface via the display 58 to facilitate operator or other user control of a batch, the process control system generally, etc. In an alternative embodiment, the security module 56 is also provided in such a server-client environment.

In order to access the configuration application or a particular software module on the workstation 18, a user may first have to log into the network of the process control system 10 of which the workstation 18 is a node. For example, each workstation, computer and other hardware device coupled to the data highway 20 may execute a network operating system, such as Windows NT®. In such cases, the processor 54 of the workstation 18 executes the operating system in accordance with software stored in the memory 52. To handle the login process, the operating system software may include a subsystem 62 dedicated to handling security functionality, such as requiring the operator to provide an authorized username and password associated therewith before permitting any access to the software modules stored in the workstation 18.

The operating system security subsystem 62 may cooperate with the security module 56 by passing the current username to the module 56 when a user interface dialog calls for insertion thereof, as will be shown hereinbelow.

In accordance with one embodiment of the present invention, and with reference once again to FIG. 1, it may be desirable to access one or more of the configuration applications or other software modules of the process control system 10 when operating a device other than one of the workstations 18 or other nodes of the network formed by the data highway 20. For example, a network 70 without a direct connection to the data highway 20 may include one or more computers 72 that may be disposed throughout a plant in various non-secure locations. The computer 72 and other devices on the network 70 are external, inasmuch as access to the applications and/or software modules of the process control system 10 involves a communication link to and/or from the process control network (which is preferably a secure network), such as via an Ethernet connection to one of the host workstations 18 or through a connection to an application station (not shown) that constitutes yet another network node of the process control system 10. The application station may serve as a dedicated application server for such external devices.

Physical access to the computer 72 may be relatively unrestricted, and the set of users authorized to log onto the computer 72 (and/or the network 70) may differ significantly from those authorized to operate network nodes of the process control system 10. For these reasons, the security modules 40 and/or 56 of the server 28 or any one of the workstations 18, respectively, may provide an additional layer of security to prevent unauthorized and otherwise improper access to the process control system 10.

When such external access is desired (and authorized), an application or software module executed by one of the devices in the process control system 10 provides access to the same or similar set of process control functions to the external device via a client/server configuration. An application station, workstation, configuration management server or any other network node of the process control system 10 may constitute the server, while the computer 72 is established as a client thereof.

Rather than relying upon any network-based security (of the network 70 or, for that matter, the network of the process control system 10) to control access to the set of available process control functions, the user of the computer 72 is requested to provide security information when making a request for execution of a certain process control function or action. In accordance with one aspect of the present invention, the collection of the security information is made contemporaneously with the initiation of the function and in association therewith. Such security information may constitute one or more usernames or other data indicative of user identification, together with a password (or passwords) associated therewith.

To this end, the computer 72 includes an application client module 74 and a security client module 76 stored in a memory 78 and adapted for execution by one or more processors 80. Any user interfaces provided in connection with the execution of the modules 74 and 76 are provided to the operator or other user via a display 82. For example, a user interface may be generated by the application client module 74 to collect the security information necessary to authorize the execution of the process control function requested by the user. The security module 56 is executed in connection with the generation of the user interface to determine what type of security information needs to be collected, as well as whether the security information collected by the user interface is sufficient to authorize execution of the process control function.

The above-described user interface may also be generated by one of the application modules 38 resident on the workstation 18. That is, the collection of security information need not be limited to execution of process control functions initiated by an external device, such as the computer 72. When the request for execution of a process control function emanates from a network node of the process control system 10, the security module 40 or 56 is then responsible for determining the type of security information to be collected and whether the function should be executed.

As described hereinabove in the section entitled "Description of the Related Art," each of the hardware devices of the process control system 10 includes a software module (not shown) that together or separately forms a user manager application for controlling user access to the process control system 10. The user manager application preferably accesses the configuration database 32 (or a downloaded version of the data stored therein) to establish the set of authorized users or operators for the process control system 10. Execution of such software generally determines whether a user can log into the network of the process control system 10, as well as establishing the rights for each user. A user logged into a particular workstation 18 or the network in general (via, for instance, the computer 72), may then be capable of certain privileges granted to the user.

In accordance with one embodiment of the present invention, additional security checks are executed by the security modules 40 and/or 56 even though the user logged into the network has certain privileges. Accordingly, security information is requested and collected subsequent to a user logging into the process control network. The security information is collected by the application modules 38 (in conjunction with the security module 40 or 56) for comparison with the data stored in the configuration database 32 (or a downloaded version of the data stored therein) to determine whether a function or action should be executed.

Figure 4:
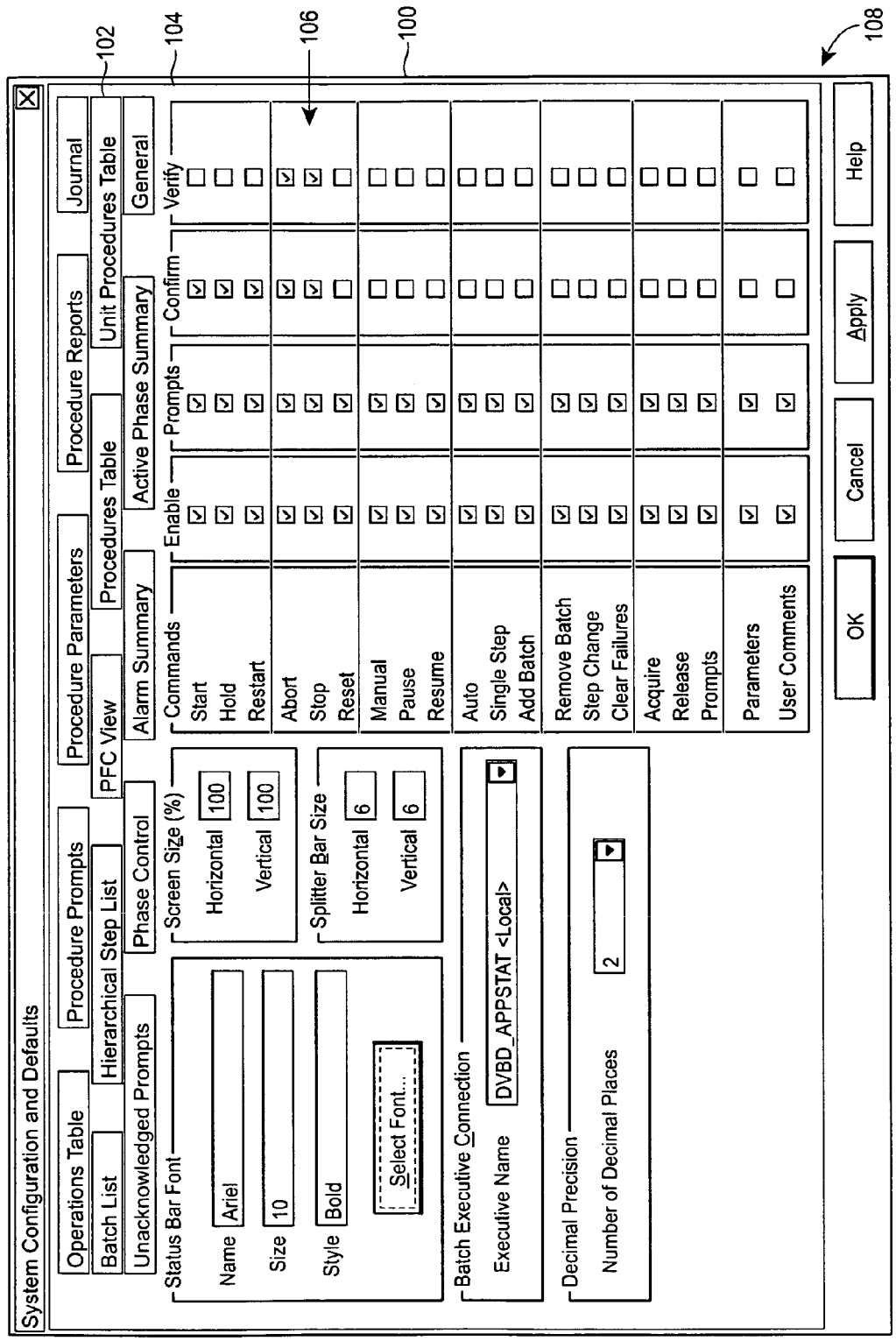
FIG. 4 is an exemplary user interface for security configuration of a first application executed by one or more of the hardware devices of the process control system of FIG. 1.

With reference now to FIG. 4, the manner in which the security information is utilized is determined by a variety of security parameters associated with the operator or user attempting to initiate the execution of the process control function, as well as with the particular function corrected. In order to establish one or more such parameters, the configuration or other application (e.g., the batch operator interface available as part of the DeltaV™ process control system) provides a configuration or settings interface 100 that includes a plurality of tabs 102, one of which corresponds with a general configuration tab 104. Selection of the general configuration tab 104 results in the generation of a security configuration interface for establishing security parameters for the functions executed by the process control system 10. The security parameters are established via a checkbox table 106. The table 106 identifies each action or function executed by the application by a command name and then provides a system administrator or other user with the capability to select or de-select one or more option fields, including "Enable," "Prompts," "Confirm," and "Verify."

Selection of the Enable option for a command ensures that this particular instance of the application will offer the command (and, therefore, the function or action initiated thereby) in a pull-down, pop-up, or other menu of the user interface of the application. The Prompts option, if selected, determines that initiation of the action or function will result in a user prompt within the user interface of the application, requesting that the user provide a confirmation that the action or function take place. Such a confirmation need not include any request or collection for security information, and merely constitute a question such as "Are you sure that you wish to abort the batch?" Security information is, however, required in the context of the confirmation if one or both of the Confirm and Verify options is also selected. A command having the "Confirm" option selected will require security information in the form of, for example, an authorized username and password associated therewith prior to execution of the action or function by the application. Selection of the Verify option for a particular command ensures that execution of the action or function cannot be initiated without the collection of verification security information, such as a username and associated password of another person authorized to verify that an action or function be executed by the process control system 10. Such verification information may but need not be required in addition to the security information of the individual requesting the initiation of the execution of the process control function.

The interface 100 also includes a plurality of buttons in an actuation area 108 to either approve (i.e., "OK"), cancel, and/or "Apply" the configuration settings set forth in connection with the tab 104, as well as any other tabs. Further information regarding such standard tools for graphical user interfaces of the type shown in FIG. 4 will not be provided, inasmuch as the manner in which such user interfaces are generally set up and operated are well known.

Figure 5:
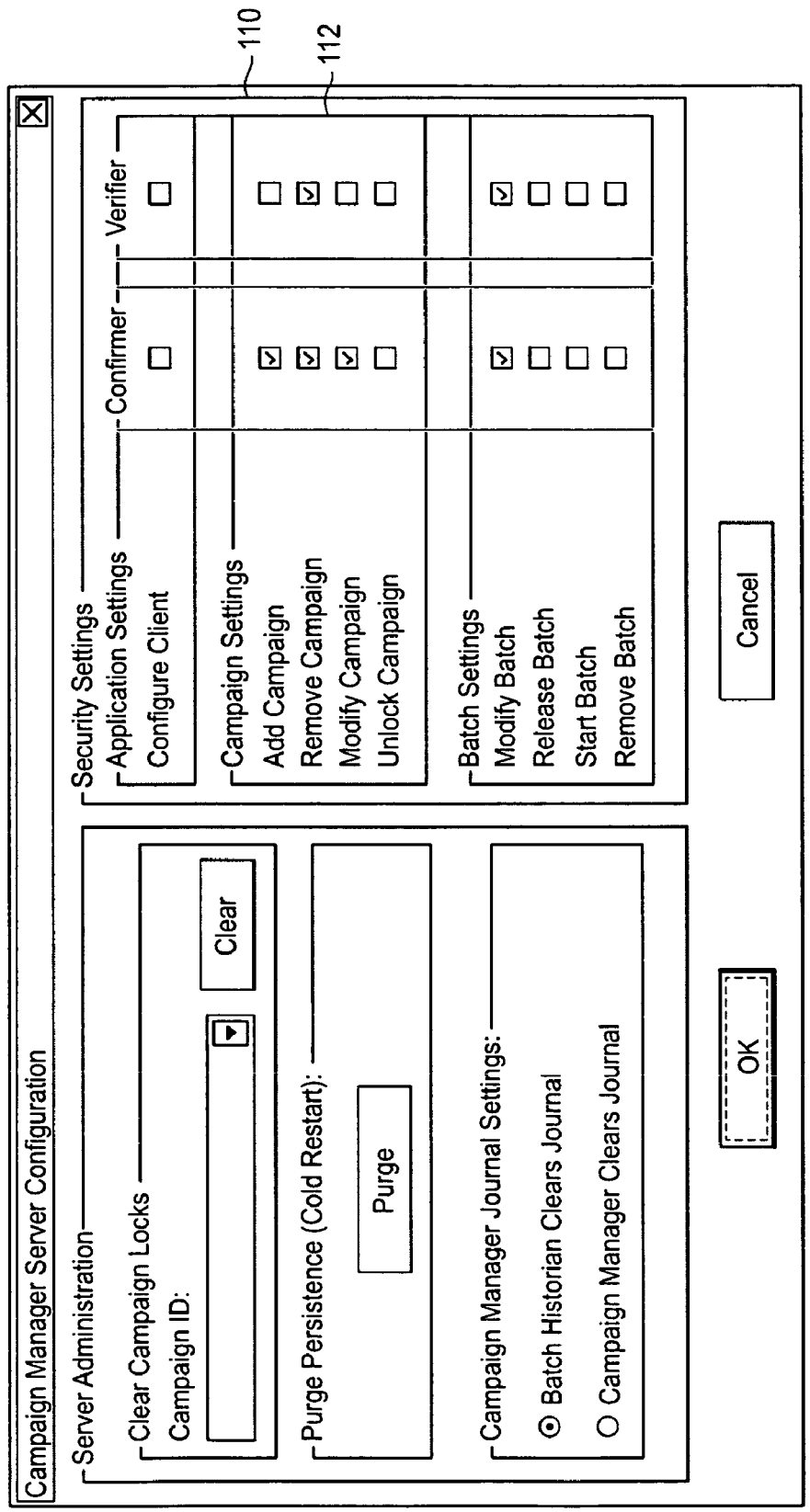
FIG. 5 is another exemplary user interface for security configuration of a second application executed by one or more of the hardware devices of the process control system of FIG. 1.

Similarly, as shown in FIG. 5, a second application, such as the Campaign Manager application that forms part of the DeltaV™ system, provides a security configuration interface 110 for establishing security parameters in connection with the functions and actions offered thereby. Each available action or function is identified in a security settings table 112 with "Confirmer" and "Verifier" options that can be selected or de-selected for reasons corresponding to those described hereinabove in connection with the configuration user interface 100. The Campaign Manager application may also generate another dialog directed to establishing the Enable and Prompt options for each instance of the application.

It shall be understood that the user interfaces 100 and 110 may be stored and executed as part of an application module, such as the configuration application 25, that collects configuration settings for the security modules 40 and/or 56 or, alternatively, be stored and executed as a part of the security modules 40 and/or 56. Regardless of where the routine responsible for generating the user interfaces 100 and 110 is stored, the configuration settings established thereby determine the manner and extent to which the execution of the applications and other software modules are integrated with, and dependent upon, the security modules 40 and/or 56.

Figure 6:
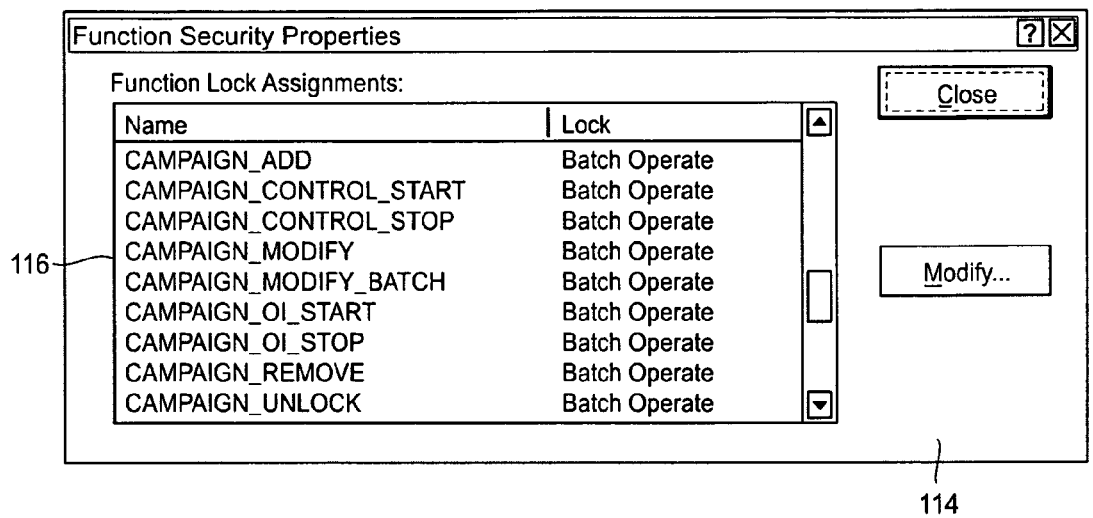
FIG. 6 is an exemplary user interface for assigning security function locks to actions performed in connection with the execution of an application by one or more of the hardware devices of the process control system of FIG. 1.
Figure 7:
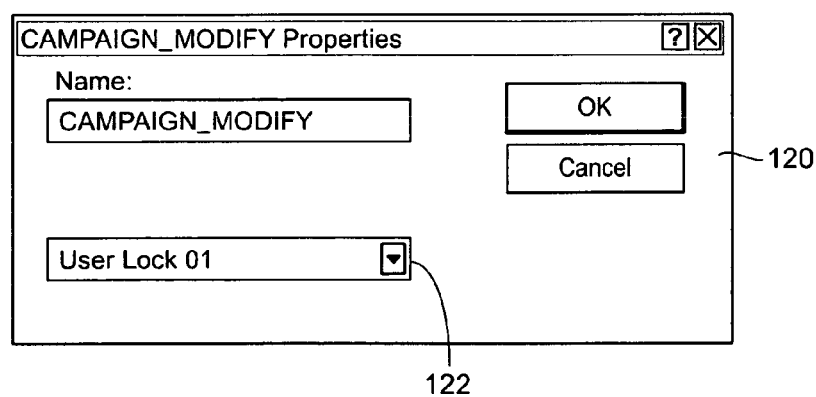
FIG. 7 is an another exemplary user interface for assigning security function locks to actions performed in connection with the execution of an application by one or more of the hardware devices of the process control system of FIG. 1.

As is known, each of the available process control functions or actions may also be assigned a function lock as a security parameter associated therewith. With reference now to FIGS. 6 and 7, an application, such as the configuration application 25, and/or the security modules 40 and 56 provide a user interface dialog 114 having an assignments window 116 that associates each function or action with a lock assigned thereto. The lock assigned to a particular function may be modified by selection of a Modify button 118 (with a mouse click or other pointing device mechanism as is known to those skilled in the art). Selection of the Modify button 118 results in the generation of a further user interface dialog 120 by the security module 40 or 56 for the function currently highlighted or selected within the window 116. The dialog 120 displays the current properties of the function or action, such as a function name and lock. The lock may be modified via selection of one of a plurality of available locks from a drop-down menu 122.

Assignment of a lock results in the storage of data representative of the lock in the configuration database 32 in association with the function or action, thereby establishing the lock as a security parameter therefor. Alternatively, the data is stored in each network node of the process control system 10 and may be stored in connection with the security module 40 or 56. In any event, the security module 40 or 56 accesses the data to determine which key is necessary for initiation of a certain function.

Figure 8:
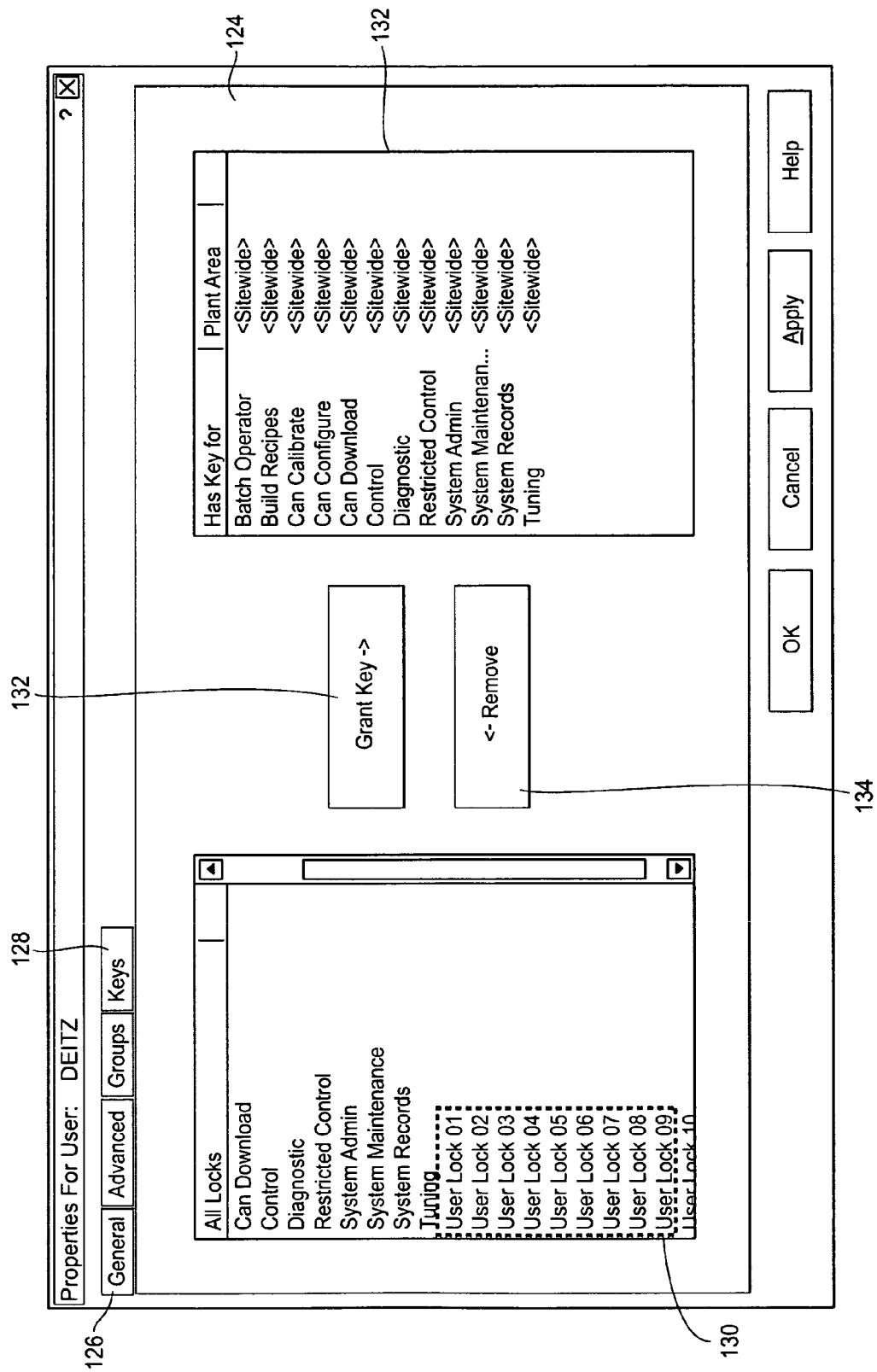
FIG. 8 is an exemplary user interface for assigning security keys to users of an application executed by one or more of the hardware devices of the process control system of FIG. 1.

With reference now to FIG. 8, a user manager application (not shown) or the configuration applications 25 or 30 (as executed by the one of the host workstations 18 or the server 28) is utilized to establish further security parameters directed to each user of the process control system 10, and more particularly, which keys are assigned to each user. To this end, a user properties dialog window 124 is generated that has a plurality of tabs 126 for selection of a keys tab 128 associated with the configuration settings utilized by the security modules 40 and 56. The user manager, configuration, or other application also provides a user interface dialog (not shown) for selecting a particular username from a list of available users. A drop-down or other menu may then provide the option to view the properties of the selected user.

Upon selecting the properties option for a particular user, selection of the keys tab 128 generates a security locks window 130 and a granted key window 132 to permit an administrator to determine which function locks a user will be granted a key. The administrator may then select one or more function locks in the window 130 and then select a "Grant Key" button 132 to transfer the functions and actions associated with the selected locks to the window 132. Preferably, selection of the button 132 also results in the generation of another dialog window (not shown) that provides for the designation of a plant area (e.g., "Sitewide") for which the granted key will be applicable. Keys that have been previously granted to a user may be removed from the window 132 via a similar, albeit reverse, selection process, namely selection of one or more keys in the window 132 and selection of a "Remove" button 134.

Figure 9:
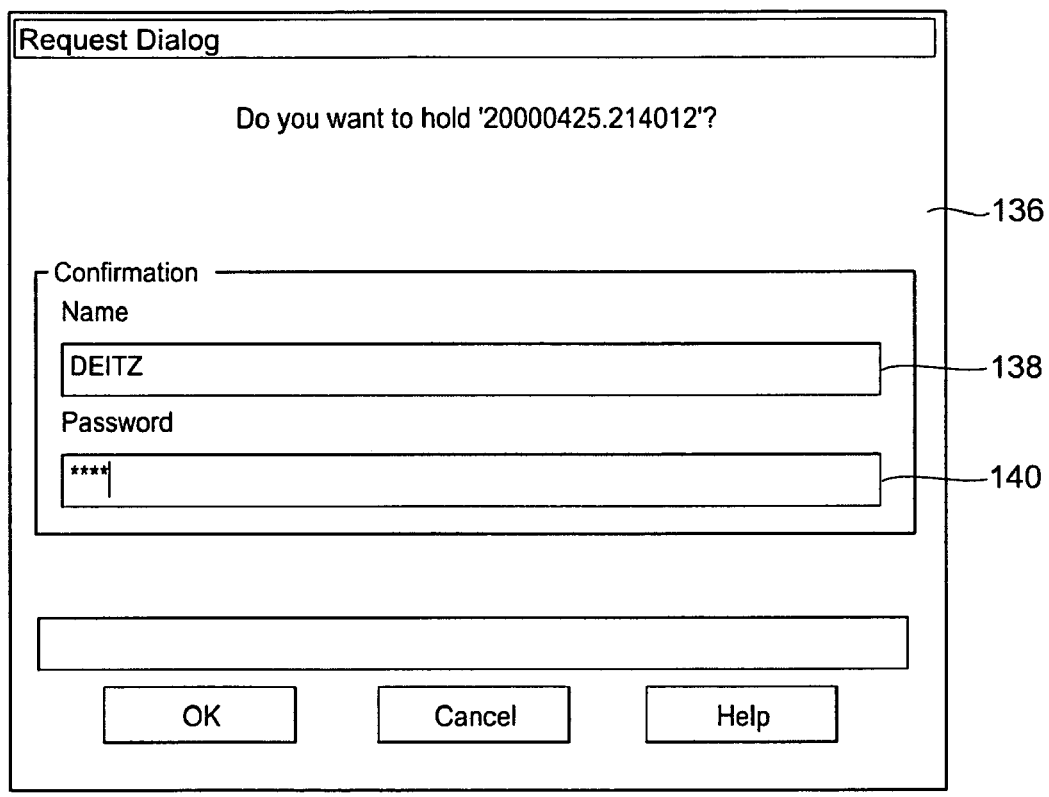
FIG. 9 is a first exemplary user interface dialog requesting security information contemporaneously with initiation of a function performed in connection with the execution of a first application by one or more of the hardware devices of the process control system of FIG. 1.

Once the aforementioned security parameters have been established via some combination of the configuration application 25, the user manager application, some other application module 38 or 50, and/or the security modules 40 and 56, the modules 40 and 56 may be executed as necessary to determine whether a function should be executed. The function may be requested by a user operating any hardware device in the process control network, such as the workstations 18, or, alternatively, by a remote user through a server-client configuration using the computer 72. In either case, the determination is generally based on the collected security information as well as the security parameters set forth in the configuration settings for both the functions and the users. For example, as shown in FIG. 9, an operator of a workstation 18 executing the aforementioned batch operator interface may select (via a drop-down menu or otherwise) a command that initiates the execution of a "Hold batch" function. In response, the batch operator interface generates a Request Dialog window 136 that collects security information in the context of a request for confirmation that the user intends to initiate the execution of the function. The type of security information collected is determined by the security parameters that have been previously established. The security information is then entered, for instance, in a name field 138 and a password field 140, and provided to the security module 40 for analysis.

The security module 40 analyzes the collected security information to compare it with data stored in the configuration database 32. In one embodiment, to increase the efficiency of the analysis, the data stored in the configuration database 32 has been downloaded to each workstation 18 such that continuous communication between the server 28 and the workstation 18 is unnecessary. Otherwise, either the security module 40 passes the collected security information via the data highway 20 to the server 28 for analysis, or the server 28 transmits the data necessary for the determination to the workstation 18. In any event, if the security module 40 determines that (1) the user associated with the username has the necessary key for the lock assigned to the function requested (i.e., the user is an authorized user), and (2) the password entered corresponds with the password associated with the username, then the security module 40 enables the application to execute the requested function.

Figure 10:
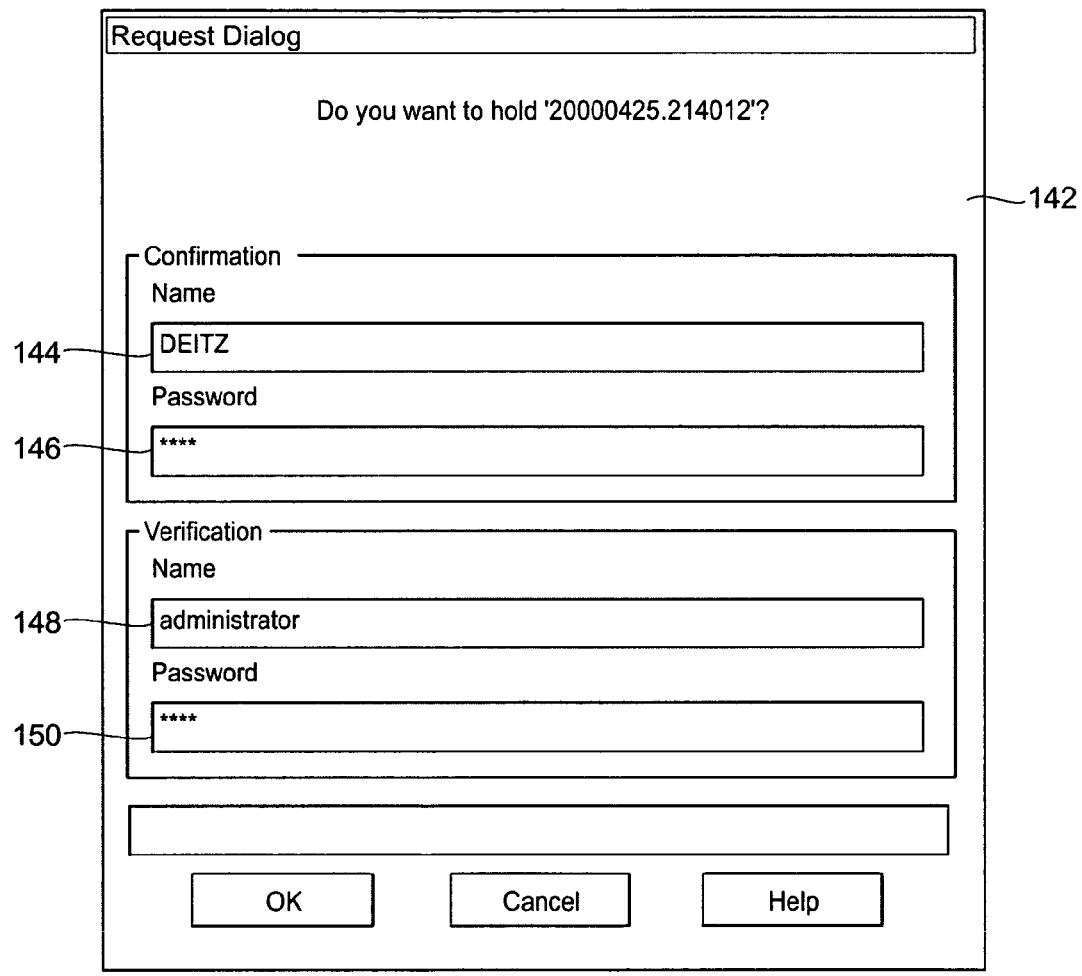
FIG. 10 is a second exemplary user interface dialog requesting security information contemporaneously with initiation of a function performed in connection with the execution of a first application by one or more of the hardware devices of the process control system of FIG. 1.

Similarly, with reference to FIG. 10, a request by a remote or networked user to abort a particular batch results in the generation of a Request Dialog window 142 having a confirmation area with a name field 144 and a password field 146, as well as a verification area with a name field 148 and a password field 150. In this case, the abort batch function has been designated via the configuration settings for the batch operator interface (see FIG. 4) as a function that requires the additional collection of security information directed to a verification that the function should be executed. That is, the abort batch function has been associated with a security parameter indicative of the need for verification information. As a result, a supervisor or another authority may be required to enter a username and password associated therewith in the fields 148 and 150, respectively, regardless of whether the requesting user has the necessary key and has entered the correct security information. This verification functionality is particularly useful in connection with the abort batch function, which is of a particularly sensitive nature.

Figure 11:
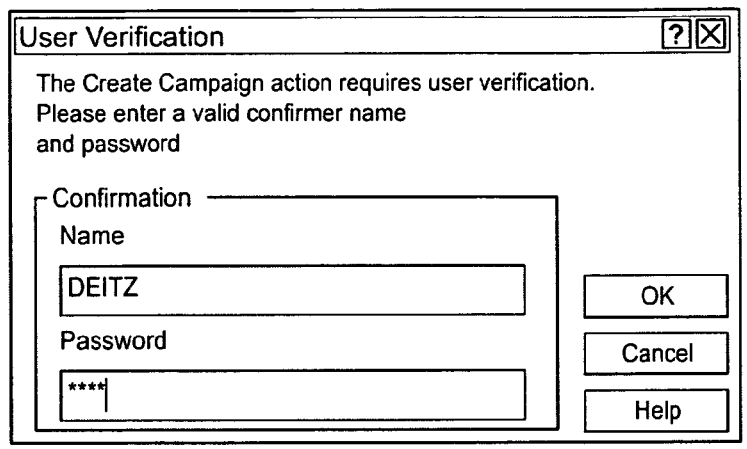
FIG. 11 is a third exemplary user interface dialog requesting security information contemporaneously with initiation of a function performed in connection with the execution of a second application by one or more of the hardware devices of the process control system of FIG. 1.
Figure 12:
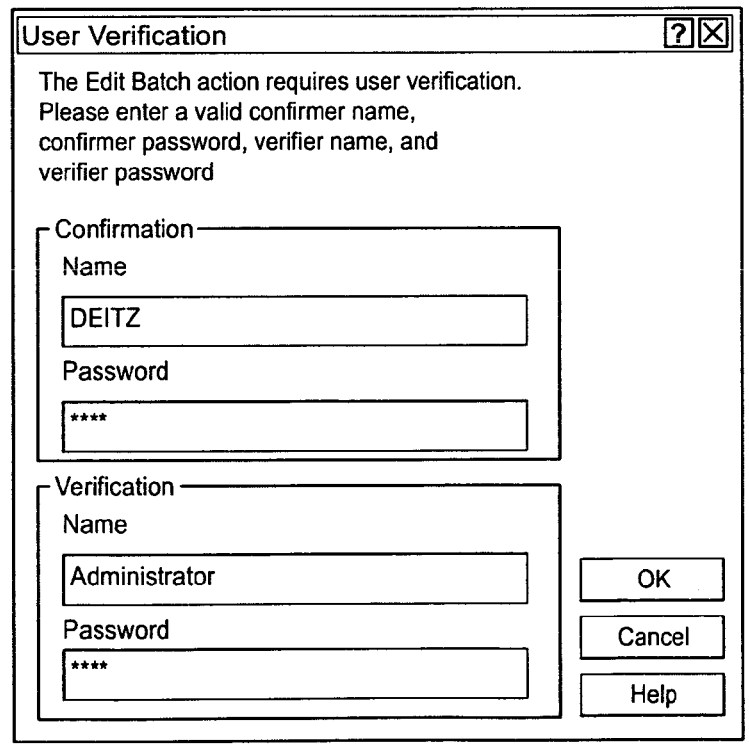
FIG. 12 is a fourth exemplary user interface dialog requesting security information contemporaneously with initiation of a function performed in connection with the execution of a second application by one or more of the hardware devices of the process control system of FIG. 1.

Additional examples of security collection user interfaces are shown in FIGS. 11–14. FIG. 11 is a dialog window for collection of security information in the form of a confirming username and password to determine whether the "Create Campaign" function should be executed. FIG. 12 presents the requesting user to provide a confirmation in the form of a username and password, as well as the security information of a user with the ability to verify that a batch should be edited.

FIGS. 13 and 14 are user interface dialogs that are generated in connection with the need for a user or operator to acknowledge a process control alarm or prompt for control information. In order for the user or operator to acknowledge the process control alarm or prompt, security information is entered as described hereinabove in connection with the aforementioned user interface dialogs. The user interface dialogs of FIGS. 13 and 14 are presented, in part, to show that the need for execution of a process control function or action need not be as a result of a user request, but rather may be initially brought about by factors arising from the process itself.

With regard to each of the above-described security information collecting dialogs, the confirming and verifying security information is preferably collected contemporaneously with the initiation of the execution of the function. In certain cases, such as the Create Campaign function, a contemporaneous collection is performed prior to the entry of any instructions or parameters for the execution of the function. Alternatively, the contemporaneous collection and security check may be postponed until the necessary instructions are provided, in order to avoid an unnecessary analysis of the security information. In either case, contemporaneous collection of the security information provides the process control application with security and/or verification functionality on an action-by-action (or function-by-function) basis.

When the user is operating the computer 72 external to the network of the process control system 10, the workstation 18, server 28, or other hardware device of the process control network may use a set of program interfaces provided as a part of Windows NT® under the acronym DCOM (Distributed Component Object Model), which is well known to those skilled in the art, to establish the necessary server-client configuration. However, any other known server-client platform may be utilized to generate the client resident in the computer 72 for providing the user interfaces associated with the process control applications and software modules described hereinabove. The server-client relationship preferably provides for encrypted communication between the network node and the external device. In this manner, the secure transmission of data representative of the security information between any server and client, or between the security modules 40 or 56 and any process control application, is facilitated.

The security modules 40 and 56 are preferably set forth as software modules compiled to constitute a Win32 executable in compliance with the WindowsNT® operating system. Prior to compilation, the software module may be programmed in any language, such as C++. However, practice of the present invention is not limited to any particular executable format, operating system, or programming language. Moreover, the security modules 40 and 56 need not constitute stand-alone executable applications, but rather may be integrated to any extent with any of the other applications or software modules executed by the network nodes of the process control system 10. For example, the security modules 40 and 56 may constitute a set of routines executed within the configuration application 25, or one of the application modules 38 or 50.

The security module 40 is preferably installed on each workstation 18 of the process control system 10, but may be shared between nodes in a network fashion as is well known to those skilled in the art. Similarly, the configuration database 32, as well as any software module, process control application or process control data, may be disposed in one or more computer-readable media in a local or distributed manner. Thus, the security information, as well as any of the security parameters associated with process control functions or users of the process control system 10, may be stored in a memory composed of multiple data storage structures.

When implemented, any of the software described herein may be stored in any computer-readable memory such as on a magnetic disk, a laser disk, or other storage medium, in a RAM or ROM of a computer or processor, etc. Likewise, this software may be delivered to a user, a process control system or the computer 72 via any known or desired delivery method including, for example, on a computer-readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or may be modulated using any suitable modulation carrier wave before being transmitted over a communication channel. Also, the terms application station, workstation, computer, laptop, etc. are all used interchangeably herein to indicate any type of processing or computer device.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system capable of executing a process control function after initiation thereof, the process control system comprising:
   a computer having a memory and a processing unit; and
   a security module stored in the memory of the computer and adapted to be executed on the processing unit of the computer, wherein the security module analyzes security information that is collected from a user contemporaneously with the initiation of the process control function and in association therewith determines whether the process control function should be executed.

2. The security system of claim 1, wherein the process control system comprises a network and the process control function is initiated via a device external to the network.

3. The security system of claim 2, wherein the device includes a client that generates a user interface to collect the security information.

4. The security system of claim 3, wherein the client passes the security information in encrypted form to the security module.

5. The security system of claim 1, further comprising a process control application stored in the memory of the computer and adapted to be executed on the processing unit of the computer, wherein the process control application generates a security configuration interface for establishing a security parameter for the process control function executed by the process control system.

6. The security system of claim 5, wherein the security parameter comprises data representative of a lock associated with the process control function executed by the process control system.

7. The security system of claim 5, wherein the security parameter comprises data representative of whether execution of the process control function requires the security information to include a user identification and a password.

8. The security system of claim 5, wherein the security parameter comprises data representative of whether execution of the process control function requires the security information to include verification information.

9. The security system of claim 1, wherein the process control system comprises a network and the computer resides at a node of the network.

10. The security system of claim 1, further comprising a process control application stored in the memory of the computer and adapted to be executed on the processing unit of the computer, wherein the process control application generates a user interface to collect the security information from the user.

11. A method of securing a process control system capable of executing a process control function after initiation thereof, wherein the process control system includes a memory, the method comprising the steps of:
    storing in the memory a security parameter associated with the process control function;
    collecting security information from a user contemporaneously with the initiation of the process control function and in association with the process control function; and
    determining whether to execute the process control function based on the collected security information and the stored security parameter.

12. The method of claim 11, wherein:
    the process control system comprises a network comprising the memory; and
    the security information collecting step comprises the step of communicating with a device external to the network.

13. The method of claim 12, wherein the security information collecting step comprises the steps of generating a client resident in the device and providing a user interface using the client.

14. The method of claim 12, wherein the security information collecting step comprises the step of passing the security information in encrypted form from the device to the network.

15. The method of claim 11, wherein the security parameter comprises data representative of whether execution of the process control function requires the security information to include a user identification and a password.

16. The method of claim 11, wherein the security parameters storing step comprises the step of generating a user interface for associating the process control function with a lock for which a user may be assigned a key.

17. The method of claim 11, wherein the security parameter comprises data representative of whether execution of the process control function requires the security information to include verification information.

18. A method of securing a process control system capable of execution of a process control function, the method comprising the steps of:
- establishing a communication link between the process control system and a device external thereto to provide for remote initiation of the execution of the process control function;
- generating a user interface via the communication link for collection of security information from a user contemporaneously with the remote initiation of the execution of the process control function; and
- determining whether the remote initiation of the execution of the process control function is authorized based on the collected security information.

19. A software system for a process control system capable of execution of a process control function, the software system comprising:
- a computer-readable medium;
- a first routine stored on the computer-readable medium that collects security information from a user contemporaneously with the initiation of the process control function and in association therewith; and
- a second routine stored on the computer-readable medium that determines whether the execution of the process control function is authorized in accordance with the collected security information.

20. The software system of claim 19, wherein the first routine is executed in a client-server configuration such that the collected security information is transmitted from a client to a server.

21. The software system of claim 20, wherein the security information is collected via a user interface at the client.

22. The software system of claim 20, wherein the client is external to the process control system.

23. The software system of claim 20, further comprising a third routine that encrypts the collected security information prior to transmission from the client to the server.

24. The software system of claim 19, further comprising a configuration routine that establishes a security parameter for the process control function.

25. The software system of claim 24, wherein the security parameter comprises data representative of a lock associated with the process control function.

26. The software system of claim 24, wherein the security parameter comprises data representative of whether execution of the process control function requires the security information to include a user identification and a password.

27. The software system of claim 24, wherein the security parameter comprises data representative of whether execution of the process control function requires the security information to include verification information.

28. A software system for a process control system capable of execution of a process control function, the software system comprising:
- a computer-readable medium;
- a first routine stored on the computer-readable medium that establishes a communication link between the process control system and a device external thereto to provide for remote initiation of the execution of the process control function;
- a second routine stored on the computer-readable medium that generates a user interface via the communication link for collection of security information from the user contemporaneously with the remote initiation of the execution of the process control function; and
- a third routine stored on the computer-readable medium that determines whether the remote initiation of the execution of the process control function is authorized based on the collected security information.

29. The software system of claim 28, wherein the security information transmitted via the communication link is encrypted.

* * * * *

UNITED STATES PATENT AND TRADEMARK OFFICE
CERTIFICATE OF CORRECTION

| | | |
|---|---|---|
| PATENT NO. | : 7,069,580 B1 | Page 1 of 1 |
| APPLICATION NO. | : 09/594678 | |
| DATED | : June 27, 2006 | |
| INVENTOR(S) | : David L. Deitz et al. | |

It is certified that error appears in the above-identified patent and that said Letters Patent is hereby corrected as shown below:

At Column 4, line 21, "an configuration" should be -- a configuration --.

Signed and Sealed this

Fourteenth Day of August, 2007

JON W. DUDAS
*Director of the United States Patent and Trademark Office*